United States Patent
Fery et al.

(10) Patent No.: US 8,377,537 B2
(45) Date of Patent: Feb. 19, 2013

(54) RECORDABLE OPTICAL STORAGE MEDIUM COMPRISING A SEMICONDUCTOR LAYER, AND RESPECTIVE MANUFACTURING METHOD

(75) Inventors: Christophe Fery, Niedereschach (DE); Larisa von Riewel, Villingen-Schwennigen (DE); Stephan Knappmann, Zimmern ob Rottweil (DE)

(73) Assignee: Thomson Licensing, Issy les Moulineaux (FR)

( * ) Notice: Subject to any disclaimer, the term of this patent is extended or adjusted under 35 U.S.C. 154(b) by 306 days.

(21) Appl. No.: 12/735,168

(22) PCT Filed: Dec. 9, 2008

(86) PCT No.: PCT/EP2008/067056
§ 371 (c)(1),
(2), (4) Date: Jun. 18, 2010

(87) PCT Pub. No.: WO2009/080486
PCT Pub. Date: Jul. 2, 2009

(65) Prior Publication Data
US 2010/0266804 A1      Oct. 21, 2010

(30) Foreign Application Priority Data
Dec. 20, 2007   (EP) ..................... 07123832

(51) Int. Cl.
*B32B 3/02*       (2006.01)
(52) U.S. Cl. ..................... 428/64.1; 428/64.4; 428/64.5; 430/270.12

(58) Field of Classification Search ................. 428/64.4; 430/270.12
See application file for complete search history.

(56) References Cited

U.S. PATENT DOCUMENTS

| 5,615,206 A | 3/1997 | Yanagisawa et al. |
| 6,365,256 B1 * | 4/2002 | Tyan et al. ................... 428/64.1 |
| 2003/0193857 A1 | 10/2003 | Ichihara et al. |
| 2005/0047302 A1 | 3/2005 | Inoue et al. |
| 2006/0120253 A1 | 6/2006 | Chen et al. |

FOREIGN PATENT DOCUMENTS

VA       1357551       10/2003

OTHER PUBLICATIONS

Hyot et al., "Phase Change Materials and Superrens", EPCOS-European Phase Change and Ovonics Science Symposium, pp. 1-6, Cambridge, England. Sep. 2005.
Search report dated Feb. 20, 2009.

* cited by examiner

*Primary Examiner* — Elizabeth Mulvaney
(74) *Attorney, Agent, or Firm* — Tutunjian & Bitetto, P.C.

(57) ABSTRACT

The recordable optical storage medium comprises a substrate layer, a data layer and a first and a second protection layer for the data layer, wherein the data layer comprises a semiconductor layer and a dopant layer with a doping material usable for doping the semiconductor layer. The semiconductor layer is in particular an intrinsic or essentially intrinsic semiconductor layer having a low reflectivity and the doping material of the dopant layer is selected such, that the reflectivity of the semiconductor layer is increased, when doping material of the dopant layer is diffused into the semiconductor layer.

10 Claims, 2 Drawing Sheets

RECORDABLE OPTICAL STORAGE MEDIUM COMPRISING A SEMICONDUCTOR LAYER, AND RESPECTIVE MANUFACTURING METHOD

This application claims the benefit, under 35 U.S.C. §365 of International Application PCT/EP2008/067056, filed Dec. 9, 2008, which was published in accordance with PCT Article 21(2) on Jul. 2, 2009 in English and which claims the benefit of European patent application No. 07123832.3, filed Dec. 20, 2007.

TECHNICAL FIELD OF THE INVENTION

The present invention relates to an optical storage medium, in particular an optical disc, which allows storing of data as marks and spaces with a high data density, and a method of manufacturing for a respective optical storage medium.

BACKGROUND OF THE INVENTION

Optical storage media are media in which data are stored in an optically readable manner, for example by means of a laser and a photo-detector being integrated within a pickup. The photo-detector is used for detecting the reflected light of the laser beam when reading data from the storage medium. In the meanwhile a large variety of optical storage media are known, which are operated with different laser wavelength, and which have different sizes for providing storage capacities from below one Gigabyte up to 50 Gigabyte (GB). The formats include read-only formats such as Audio CD and Video DVD, write-once optical media such as CD-R and DVD-R, DVD+R, as well as rewritable formats like CD-RW, DVD-RW and DVD+RW. Digital data are stored on these media along tracks in one or more layers of the media.

The storage medium with the highest data capacity is at present the Blu-Ray disc (BD), which allows to store 50 GB on a dual layer disc. Available Blu-Ray formats are at present read only BD-ROM, re-writable BD-RE and write once BD-R discs. For reading and writing of a Blu-Ray disc an optical pickup with a laser wavelength of 405 nm is used. On the Blu-Ray disc a track pitch of 320 nm and a mark length from 2T to 8T and 9T is used, where T is the channel bit length, and which corresponds with a minimum mark length of 138-160 nm. The re-writable BD-RE disc is based on a phase change technology comprising a phase change layer, which uses for example a compound of AgInSbTe or GeSbTe. Further information about the Blu-Ray disc system is available for example from the Blu-Ray group via internet: www.blu-raydisc.com.

New optical storage media with a super resolution near-field structure (Super-RENS) offer the possibility to increase the data density of the optical storage medium by a factor of three to four in one dimension as compared with the Blu-Ray disc. This is possible by a so-called Super-RENS structure, which is placed above a data layer of the optical storage medium, and which significantly reduces the effective size of a light spot used for reading from or writing to the optical storage medium. The super resolution layer is also called a mask layer because it is arranged above the data layer and for some materials only the high intensity center part of a laser beam can penetrate the mask layer. Further, materials can be used for the mask layer which show a higher reflectivity in the center part of the focused laser beam, e.g. InSb shows this nonlinear optical property.

The Super-RENS effect allows to record and read data stored in marks of an optical disc, which have a size below the resolution limit of an optical pick-up used for reading or writing the data on the disc. As known, the optical diffraction limit of the resolution of an optical pick-up is about lambda/(2 NA), where lambda is the laser wavelength and NA the numerical aperture of the objective lens of the optical pickup.

A super resolution near field technique for recording and retrieving small marks beyond the optical diffraction limit is described be Tominaga, Nakano and Atoda in "An approach for recording and readout beyond the diffraction limit with an Sb thin film", Applied Physics Letters, Vol. 73, No. 15, 12 Oct. 1998, which describe to use an Sb thin film as the super resolution layer.

It is known that also semiconductor materials can be used as a mask layer for Super-RENS optical storage media, for example ZnO. A semiconductor material of this kind for a Super-RENS layer is described by Takamori et al, "Energy-Gap-Induced super-Resolution Optical Disc using ZnO Interference Film", Japanese Journal of Applied Physics, Vol. 44, No. 5b, 2005, pp. 3627-3630. Takamori et al describe a Super-RENS disc with ZnO as an active layer deposited on a ROM type substrate and show that a temperature rise can locally increase the ZnO transmittance, thus triggering a near field interaction capable of below-diffraction-limit detection.

In the articles Hyot et al, "Phase change materials and Super-RENS", E*PCOS 05, Technical Digest, Cambridge, 2005, and Pichon et al, "Multiphysics Simulation of Super-Resolution BD ROM Optical Disk Readout" 2006 IEEE, 0-7803-9494-1/06, PP 206-208, a semi-conducting mask layer is proposed in which a local change of the refractive index can be obtained through photo generation of free carriers. A thermal description is given to provide information on temperature distribution during readout of the data layer.

In US2003/0193857 an optical disc comprising a Super-RENS mask layer is described comprising a semiconductor film which can have a contamination or a matrix material mixed into the semiconductor. The Super-RENS detection is based on an increase of the transmittance of the mask layer, with the transmittance being increased by absorption saturation of the semiconductor layer upon radiation with an incident laser beam. The mask layer may include impurities, which allows to shift the energy gap such that efficient absorption is obtained for a certain wavelength.

The Super-RENS layers at present under development for future optical storage media have the drawback that a comparatively high laser power is needed to activate the mask layer by high temperature or high laser power. There is also a need to provide a Super-RENS recordable disc having a high long-time stability.

BRIEF SUMMARY OF THE INVENTION

The recordable optic storage medium comprises a substrate layer, a data layer and a first and a second protection layer for the data layer, wherein the data layer comprises a semiconductor layer and a dopant layer with a doping material useable for doping the semiconductor layer.

The doping material diffuses into the semiconductor layer, when marks are written on the optical storage medium by means of a laser beam of an optical pick-up. The laser power of the laser is in particular adjusted such, that the temperature is sufficiently high only for a small inner region of the spot of the laser beam impinging on the optical storage medium, for causing a diffusion of doping material only for this small region of the semiconductor layer.

The semiconductor layer is in particular an intrinsic or essentially intrinsic semiconductor layer having a low reflectivity and the doping material of the dopant layer is selected such, that the reflectivity of the semiconductor layer is increased during reading of a recorded data layer with a read-out laser power of an optical pickup, when doping material of the dopant layer was diffused into the semiconductor layer during recording of data.

In a preferred embodiment, the laser power is selected such, that the sizes of the recorded marks are below the optical resolution limit of a corresponding optical pick-up. A recorded area of the optical storage medium comprises therefore tracks with marks and spaces, wherein the marks are represented by small regions, in which doping material is diffused into the semiconductor layer, and spaces, in which no doping material is diffused into the semiconductor layer. Alternatively, the spaces may be represented by small regions, in which doping material is diffused into the semiconductor layer and the marks by regions, in which no doping material is diffused into the semiconductor layer.

In a further aspect of the invention, the semiconductor material consists of an indium alloy, for example InSb, which has a low reflectivity when arranged as an intrinsic or essentially intrinsic semiconductor layer on the optical storage medium. As a doping material, advantageously selenium or tellurium can be used, which provides a n-doping of the semiconductor layer and which increases the reflectivity of the indium alloy semiconductor layer at a certain laser power. When sufficient n-doping material diffuses into the semiconductor layer, the reflectivity of the semiconductor layer is increased at least by a factor of two, which is sufficient for providing a good signal-to-noise ratio, when recording and reading data on the optical storage medium.

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

Figure 1:
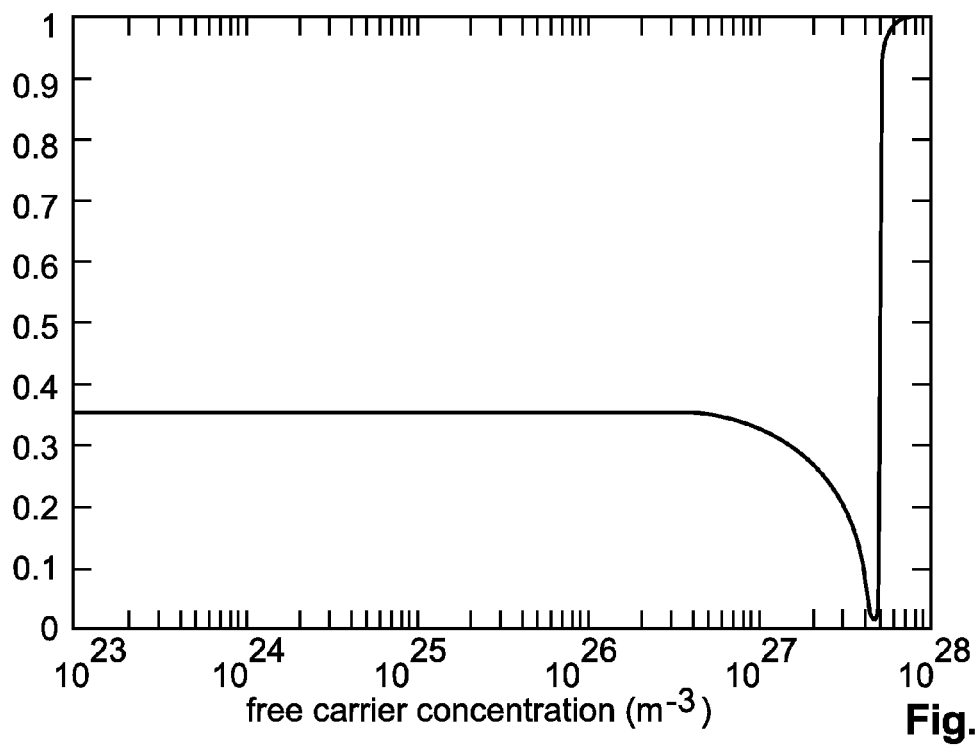
FIG. 1 a calculated reflectivity factor for an InSb layer as a function of the free carrier concentration, FIG. 2 a calculation of the absorption coefficient in dependency of the free carrier concentration for an InSb layer, FIG. 3 a calculation of the reflectivity of a n-doped semiconductor in dependency of the laser power and the doping concentration of the semiconductor, and FIG. 4 a simplified cross section of an optical storage medium comprising a data layer with two semiconductor layers and a dopant layer.

The reflectivity R of a thin semiconductor layer is a function of the free carrier concentration and the thickness of the layer. The free carrier concentration can be calculated by using the Drude model of free electrons in solids. For a semiconducting layer with a thickness d, one can write the free carrier concentration N as follows:

$$N \propto (1-R) \cdot [1 - \exp(-\alpha d)] \frac{1}{d}$$

where $\alpha$ is the absorption coefficient of the material. The resulting reflectivity R as a function of the free carrier concentration is shown in FIG. 1 for an InSb layer. As can be seen, above a certain threshold of the free carrier concentration, the reflectivity rises to a level of almost one.

Figure 2:
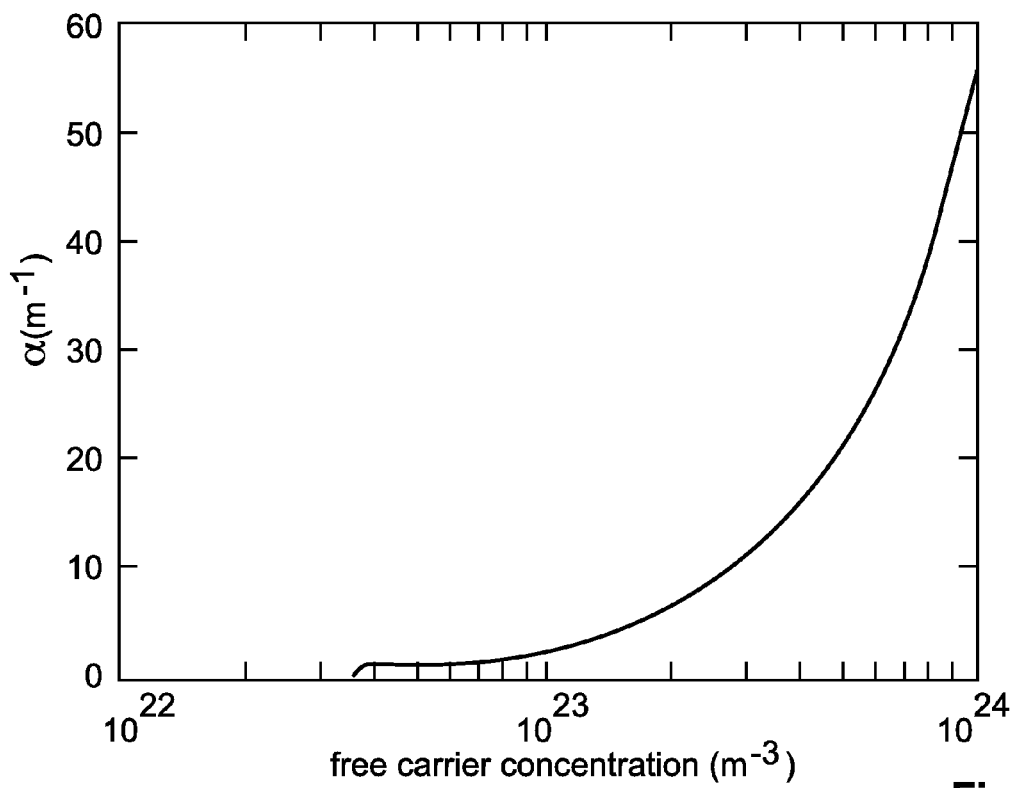

The dependency between the absorption coefficient $\alpha$ and the free carrier concentration N is shown in FIG. 2, which shows the calculated absorption coefficient $\alpha$ as a function of the free carrier concentration for an InSb layer. Thus, by increasing $\alpha$, the free carrier concentration will be enhanced.

Figure 3:
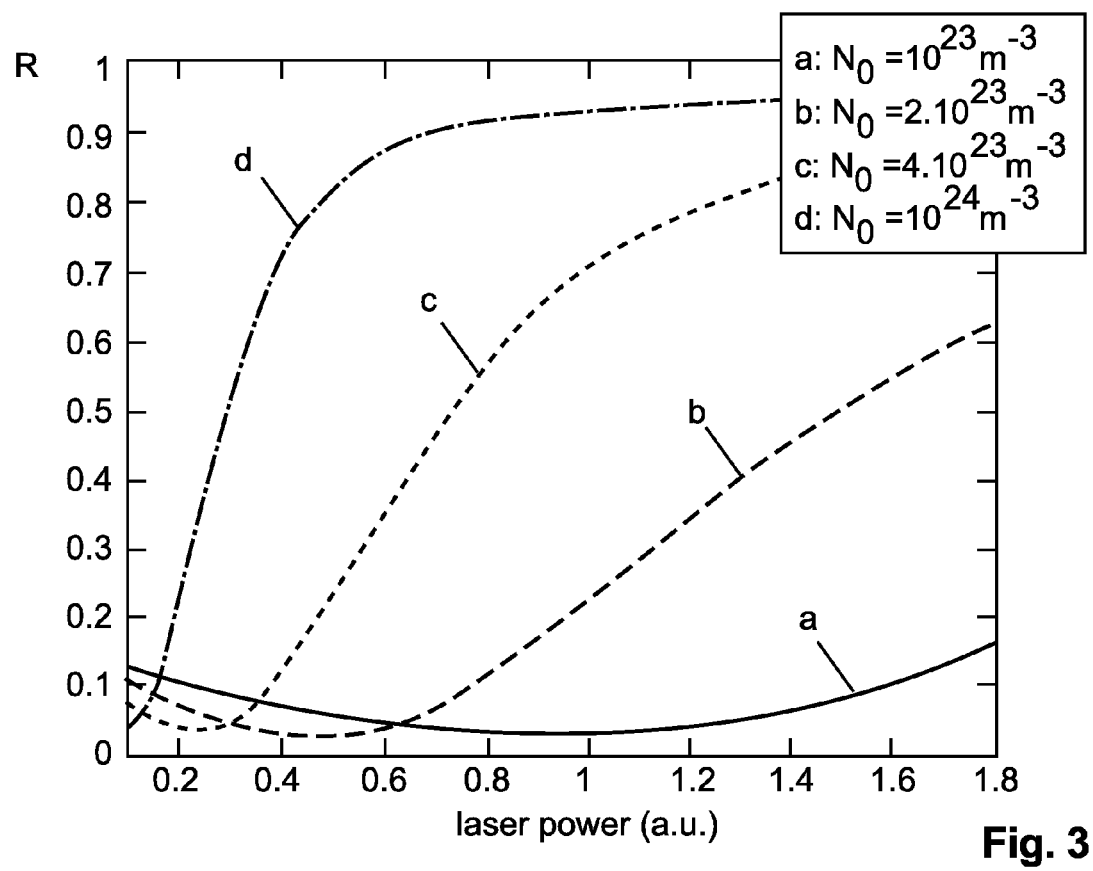

If the semiconductor is doped, the absorption coefficient $\alpha$ of the semiconductor is much higher and the free carrier generation N is correspondingly also higher, the reflectivity of the semiconductor layer is enhanced therefore. In addition, the free carrier concentration can be enhanced in particular by laser absorption from an initial intrinsic carrier concentration N to a concentration N' when irradiated. This is shown in FIG. 3, where the reflectivity R is plotted as a function of the laser power for several doping concentrations $N_0$.

If the semiconductor material is n-doped, the number of free electrons representing the free carrier concentration N is increased. When the doping increases to a value of $10^{24}$ m$^{-3}$, a high reflectivity factor can be obtained even when using a comparatively low laser power. Then, one can expect to trigger a near-field Super-RENS effect already with a lower laser power, thus limiting the heat dissipation in the disk. As can be seen in FIG. 3, a doping with a concentration of $N_0=10^{24}$ m$^{-3}$ is sufficient for providing a rise of the reflectivity factor from about 0.2 to 0.8, when increasing the laser power from 0.2 to 0.4 arbitrary units.

Figure 4:
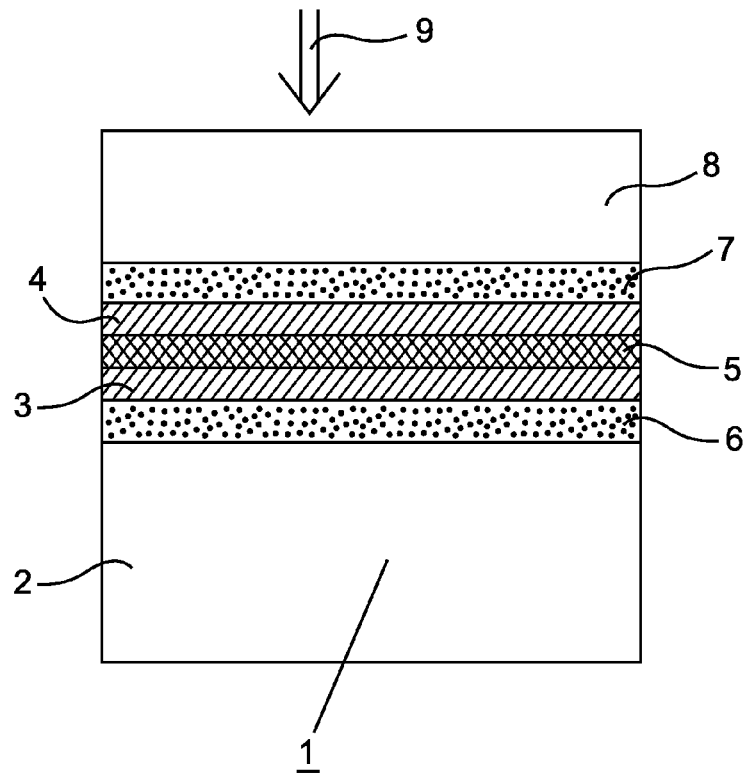

The above described effect can be utilized in particular for a write once optical disc (WORM). A preferred embodiment of a WORM disc is shown in a simplified cross section in FIG. 4, which shows an optical disc 1 comprising a substrate layer 2, on which a tracking structure is arranged. On the substrate layer 2 a protection layer 6 made of dielectric material is provided, on which a data layer comprising two semiconductor layers 3, 4 and a dopant layer 5, sandwiched between the two semiconductor layers 3, 4 is arranged. On the data layer a second protection layer 7 made of dielectric material is arranged, on which further a cover layer 8 is placed. The tracking structure, for example a land/groove structure or a grating structure, is provided for recording of data, for providing tracking information for an optical pickup, when moving along a track of the optical disc 1.

For the substrate layer 2 and the cover layer 8 for example plastic materials are used. For the protection layers 6, 7, for example the material ZnS:SiO$_2$ can be used, which provides a diffusion protection and a heat protection for the plastic materials. Further, the thickness of the dielectric layers can be adjusted to optimize the reflectivity change and super resolution signal. In a preferred embodiment, for the semiconductor layers 3, 4 indium antimonide In$_{0.5}$ Sb$_{0.5}$ layers with a thickness of each 10 nm are used, and for the dopant layer a pure layer of a doping material with a thickness of 1-5 nm, in particular a n-doping material like selenium or tellurium, is used.

Alternatively, a data layer with only one semiconductor layer and one dopant layer may be used, but it is expected that a data layer comprising two semiconductor layers, between which a dopant layer 5 is sandwiched, provides the best results. The InSb layer may be replaced also by any other indium alloy, for example InN, InP, and InAs. In addition, a reflective layer may be used between the substrate layer 2 and the dielectric layer 6, when the optical disc 1 is designed such, that a laser beam is applied from above, penetrating first the cover layer 8. When the laser beam is applied from below, penetrating first the substrate layer 2, a reflective layer may be arranged between dielectric layer 7 and the cover layer 8.

Further, an interface layer can be included between the first dielectric layer 6 and the semiconductor layer 3, between the semiconductor layer 4 and the dielectric layer 7, or between both, for example comprising the material GeN for providing an additional diffusion barrier for the optical disc. Also, the doping material of the dopant layer 5 can be included into a host material to provide easy manufacturing of the dopant layer 5. The dopant layer 5 can be arranged then on the semiconductor layer 3 for example by means of a sputter deposition, which uses a sputtering target, in which the dopant material is already included into the host material.

A recording of data with a high data density can be made on the optical disc 1 as follows: A laser beam 9 penetrates the cover layer 8 and impinges on the data layer with the two semiconductor layers 3, 4 and the doping layer 5 for writing marks along a track. The marks are separated by spaces, for providing a mark/space data information along the track, as known. Because of the relatively low reflectivity and corresponding high absorption of the semiconductor layers 3, 4, the layers 3, 4 are heated by the laser beam 9. The intensity of the laser beam 9 is adjusted such, that only in the center of the light spot as provided on the data layer, the heat is sufficiently high, so that doping material of the doping layer 5 diffuses into the surrounding semiconductor layers 3, 4.

When the laser beam 9 moves further along the track, marks with a defined length can be recorded therefore, in dependence of the on-time of the laser beam. The marks are represented on the optical disc by the areas, in which doping material is diffused into the semiconductor layers 3, 4. Because the intensity of the laser beam 9 is adjusted such, that only in the center of the light spot the heat is sufficiently high for a diffusion of the doping material into the semiconductor layers 3, 4, the width of the marks and also the length of the shortest mark is considerably smaller than the size of the light spot of the laser beam on the layers 3, 4. The size of the marks can be therefore below the optical resolution limit lambda/2NA of a corresponding optical pick-up, having a width for example of about 120 nm, when a Blu-Ray type pick-up with a wavelength of 405 nm is used.

It can be assumed that marks recorded with this method have a high long-time stability, because an InSb layer doped with selenium or tellurium is a temperature stable compound, and therefore a highly reliable data storage can be provided by this method. A recorded optical disc of this kind is in particular not sensitive to visible light.

For a reading of data on the optical disc 1, the pick-up moves along a track on which marks and spaces are recorded. When the laser beam 9 impinges on a mark of a track, the reflected light from the optical disc 1 increases, because the light of the laser beam generates a high number of electrons in the conduction band of the doped semiconductor material, which increases the reflectivity factor. As described before with regard to FIG. 3, if an InSb semiconductor is doped sufficiently high with n-doping material, the absorption coefficient a of the semiconductor layer is much higher and the free carrier generation N is increased when irradiated with a laser beam, and therefore, the reflectivity of the InSb semiconductor layer is significantly increased.

The recorded marks can be detected hence easily because of an increase of the reflected light, even when the size of a mark is much smaller than the size of the light spot of the laser beam 9 impinging on this mark. Therefore, a super resolution optical disc can be provided, without the need of an additional mask layer, as required for most types of Super-RENS ROM discs.

The laser power for reading of the data is in particular much lower than for writing of the data, because no heat based Super-RENS effect has to be used for reading of the data of the optical disc 1. It has to be avoided also, that any further doping material diffuses into the semiconductor layers 3, 4, which would destroy the recorded data structure, when reading data. Because of the comparatively low reading power it is expected that a high reading speed can be used for reading data from the optical disc 1. As can be seen from FIG. 3, the reflectivity of the semiconductor material increases already at a laser power which is by a factor of at least 2 or 3 lower compared to the intrinsic material, when the semiconductor layers 3, 4 are doped with a doping material of a density of $10^{24}$ m$^{-3}$.

Also other embodiments of the invention can be made by a person skilled in the art without departing from the spirit and scope of the present invention. The invention is in particular not limited for a use with a pickup unit comprising a Blu-Ray type pick-up. The invention resides therefore in the claims herein after appended.

The invention claimed is:

1. Recordable optical storage medium comprising a substrate layer, a data layer and a first and a second protection layer for the data layer, wherein the data layer comprises a semiconductor layer and a dopant layer with a doping material usable for doping the semiconductor layer.

2. Optical storage medium according to claim 1, wherein the doping material of the dopant layer is selected such, that the reflectivity of the semiconductor layer is increased during reading of a recorded data layer having doping material of the dopant layer diffused into the semiconductor layer.

3. Optical storage medium according to claim 1, wherein the semiconductor material is from one of the III-V semiconductor family, for example one of an indium alloy InN, InP, InAs, or InSb, and wherein the semiconductor layer is an intrinsic semiconductor layer.

4. Optical storage medium according to claim 1, wherein the data layer comprises two semiconductor layers, between which the dopant layer is arranged, and a first and a second protective layer, between which the data layer is arranged.

5. Optical storage medium according to claim 1, wherein the dopant layer comprises a n-doping material, for example selenium and/or tellurium.

6. Optical storage medium according to claim 1, wherein the dopant layer consists of a pure doping material.

7. Optical storage medium according to claim 1, wherein the semiconductor layer and the dopant layer are selected such, that the reflectivity of the semiconductor layer doped by the doping material of the dopant layer is increased at least by a factor of 2, when irradiated with a laser beam having a wavelength within the visible range.

8. Optical storage medium according to claim 1, wherein the substrate layer comprises a land/groove structure or a grating structure for providing a tracking information.

9. Method for manufacturing an optical storage medium according to claim 1, with the step of using a sputtering method for depositing the semiconductor layer and the dopant layer on the substrate layer.

10. Method according to claim 9, wherein the material for the dopant layer is arranged together with a host material in a sputtering target.

* * * * *